Jan. 22, 1935. W. R. WEEKS 1,988,990
APPARATUS FOR SIMULTANEOUSLY COATING THE ENDS OF A NUMBER OF OBJECTS
Filed July 17, 1933 2 Sheets-Sheet 1

INVENTOR
W. R. WEEKS
BY
ATTORNEY

Patented Jan. 22, 1935

1,988,990

UNITED STATES PATENT OFFICE 1,988,990

APPARATUS FOR SIMULTANEOUSLY COATING THE ENDS OF A NUMBER OF OBJECTS

Walter Roy Weeks, Paris, France

Application July 17, 1933, Serial No. 680,876
In France September 16, 1932

10 Claims. (Cl. 91—60)

A current industrial process employed when it is desired to obtain small identical objects of simple form, for example, corset stays, consists in making the objects by the subdivision of a ribbon, band or bar of great length; this is the case, for example, when these objects comprise blades or spindles of uniform profile and predetermined length. If these objects are to be coated with, for example, cellulose, this coating may be applied to the main ribbon, band or bar, but when the ribbon etc., is divided into short lengths, the ends of the segments obtained are uncovered. It is then necessary to proceed with the application of a local coating which makes necessary a preliminary sorting of the segments with a view to obtaining a sheaf with suitable spaces between the segments, such sorting necessitating meticulous and costly manual work.

The present invention has for its object an equipment which enables small objects, such as those formed as above described, to be sorted and have their ends coated mechanically.

The equipment according to the invention is composed essentially of a distributor which groups the objects in a sheaf with suitable intervals between the objects, a carriage intended to support the sheaf thus formed and an arrangement for dipping or steeping the sheaf in the coating material.

The distributor comprises a hopper with a movable wall in which are stacked the objects to be treated and at the base of which is a system of ejectors discharging the objects one by one to a supply chute which conducts the objects to the entrance to one or several resilient supports where the objects are introduced one at a time by pusher gear having a variable stroke.

The supports referred to are mounted on a carriage which receives, through an appropriate transmission, an advancing movement each time a pair of supports has gathered a predetermined number of objects until a number of predetermined strokes have been made.

When all the supports of the carriage have been filled with objects the carriage is conveyed to a position above a vat which is filled with coating material and which is supported by a movable platform arranged to be raised and lowered. For preference, there is used a cam which causes the vat to carry out alternating vertical movements.

The invention is illustrated by way of example in the accompanying drawings in which.

In the following description it is assumed, for simplicity of explanation, that the objects to be treated are metal blades.

Figure 1:
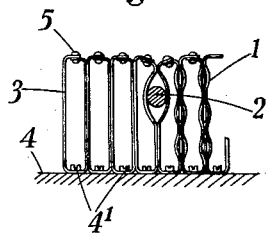
Fig. 1 is an end elevation of part of a support provided by flexible elements.
Figure 2:
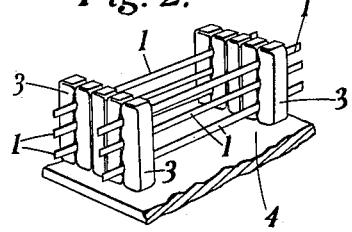
Fig. 2 is a perspective view showing how the objects (1) to be treated are disposed in the support.

The blades are preliminary arranged in the following manner: they are inserted between the adjacent faces of blade springs 3 that are bent to the rectangular form shown and are united at 5 at their extremities, the blade springs being fixed by screws 4' to a base 4. The blade springs are arranged one closely adjacent the other and resiliently hold the objects 2 inserted between them. In the present case it is assumed that there are two corresponding groups of blade springs 3 and that several blades 1 are introduced successively between two adjacent springs, the blades being thus arranged in tiers as shown in Figs. 1 and 2. The desired spacing between the blades is maintained owing to the pressure of the springs 3.

Figure 3:
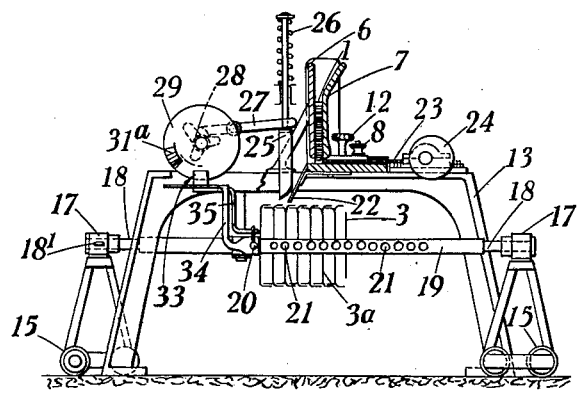
Fig. 3 shows, in elevation and partly in section, an automatic distributor adapted to place objects such as (1) in the support.
Figure 4:
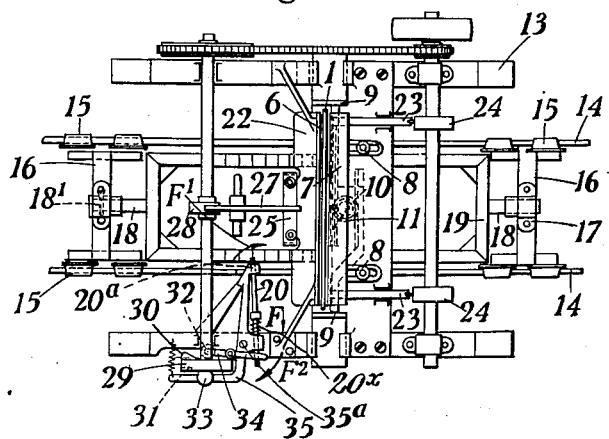
Fig. 4 is a plan view of the machine illustrated in Fig. 3.

The blades 1 are automatically placed in the support by means of the distributor illustrated in Figs. 3 and 4.

The blades 1 are stacked between two jaws, the one 6 being fixed and the other 7 being movable. The jaw 7 may be located in any suitable position with the aid of a set-screw 8. The space between the jaws is closed at two sides by sliding cheeks 9 adapted to be simultaneously moved towards and from each other by means, for example, of two toothed racks 10 meshing with a pinion 11 controlled by a hand-wheel 12. When the blades 1 have been introduced between the jaws, the stack is regularized by a person adjusting the jaw 7 and the cheeks 9; it being desirable to allow slight play to permit the free descent of the blades when the distributor is functioning.

The supply hopper thus provided by the jaws 6, 7 and the cheeks 9 is carried by a bed 13 arranged above a runway 14 on which is a carriage bearing the support having the blade springs 3. This carriage comprises sets of rollers 15 joined by transverse members 16 (Fig. 4). Each transverse member 16 carries, at its middle part, a bearing 17 in which journals an axle 18 connected at its inner end to a frame 19; on the longitudinal members of the frame at the sides thereof are arranged the flexible elements 3. A suitable locking device comprising, for example, a pin 18' permits the frame to be fixed in either of two positions, each position at 180° to the other, which it will need to occupy in view of the provision of two sets of flexible elements 3 and 3a.

The carriage thus provided is introduced under the frame 13 and it is held in place by a finger 20 forming a bolt and engaging with one of a number of holes 21 provided along the length of one side of the frame 19. The functioning of the bolt, which serves at the same time to produce the automatic and intermittent advance of the carriage will be described further.

The supply hopper is completed by an inclined plane 22 which extends across the bottom of the hopper and the lower edge of which is located a short distance above the flexible elements 3. The blades are ejected from the hopper by two pushers 23 controlled by cams 24 and act in synchronism. The blades 1 slide along the inclined plane 22 and then fall edgewise towards a line between two flexible elements and are forced between the elements owing to their being engaged by a vertical pusher 25 the lowering of which, against the action of a restoring spring 26, is brought about by a pivoted lever 27 controlled by a cam 28. The cam 28 (Fig. 3) is furnished with three noses the heights of which progressively decrease one to the other so that the pusher 25 carries out three strokes each of different length whereby the correct spacing of the blades is ensured. It will be understood that there may be as many noses of progressively decreasing height as blades 1 it is desired to dispose in each interval between the flexible elements. Naturally, one complete revolution of the cam 28 corresponds to three revolutions of each cam 24.

When a space between two elements 3 has received the desired number of blades (three in the present case) the frame 19 is made to execute a longitudinal displacement corresponding to the distance between two spaces. This displacement is determined in the following manner by the action of bolt 20. The bolt receives two movements: a longitudinal reciprocating movement (arrow F) and an oscillatory movement (arrow F¹) under the action of a cam 29 carrying on one of its cheeks a boss 30 and having in its other cheek a cavity 31. Rollers 32 and 33 carried respectively by arms 34 and 35 are maintained constantly in contact with the cheeks of the cam 29. During the passing of the boss 30, the lever 34 is displaced in the direction of the arrow F². In this movement, it withdraws the bolt 20 in the direction of the arrow F and the extremity 20a of this bolt leaves the corresponding hole 21 in the frame 19. At this moment the roller 33 comes opposite the cavity 31 and the lever 35 turns on its axle 35a in the direction of the arrow F¹ so that the extremity 20a of the bolt is located opposite that hole 21 next adjacent the first hole considered. At the same time, by reason of the rotation of the cam 29 the boss 30 ceases its action on the roller 32 and the bolt 20 under the action of a restoring spring 20ˣ enters this hole. The cam in continuing its rotation determines, by the action of the ramp 31a, which ramp forms one end of the depression 31 on the face of the cam, the return of lever 35 to its initial position and as a result brings about the advance of frame 19 owing to the lever 35 and bolt 20 being turned on pivot 35a. The distance between the axes of holes 21 must, evidently, correspond to the distance between the spaces between the elements 3.

The frame 19 comprises elements 3 on two sides (Fig. 3) and, when one of the sides is entirely loaded with blades such as 1, it suffices to turn the frame on its bearing for introducing, opposite the inclined plane 22, the opposite face that is furnished with elements 3a. The same operations are performed and the carriage fully charged with blades 1 is introduced to a dipping device where the extremities of the blades are plunged in a bath of suitable coating material.

Figure 5:
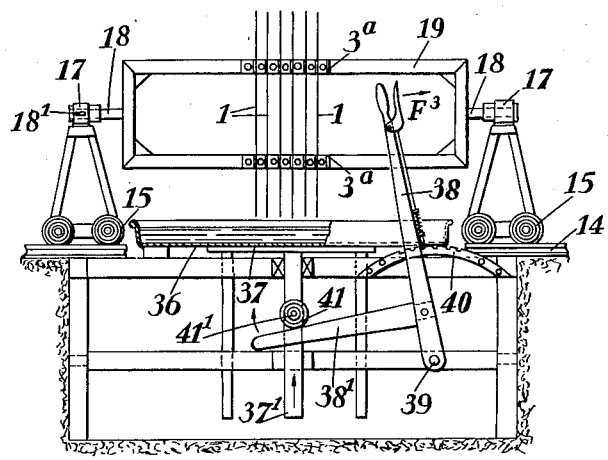
Fig. 5 is an elevation of an apparatus adapted to dip or steep the objects to be treated.
Figure 6:
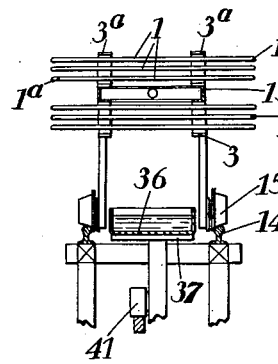
Figs. 6 and 7 are details, partly in section, connected with the apparatus illustrated in Fig. 5.
Figure 7:
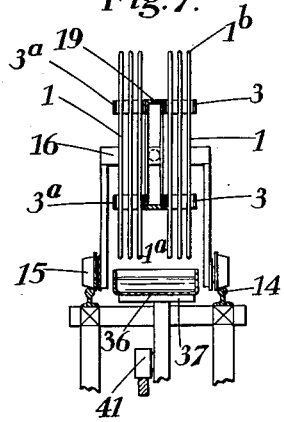

In view of this coating operation, the carriage is displaced on the runway 14 and introduced above a vat 36 containing the coating material (Fig. 6). The frame 19 is then turned around its longitudinal axis in 90° steps to bring the blades 1 to the positions indicated in Figs. 5, 6 and 7.

The vat 36 is carried by a platform 37 adapted to be displaced vertically by means of a controlling lever 38 pivoted at point 39. The position of this lever and, as a result, the position of vat 36 with respect to the extremities of the blades 1 may be regulated with the aid of a toothed sector 40 or similar device. Sometimes, experience has shown that it is advantageous to produce several consecutive immersions of the objects to facilitate drying. The successive immersions may be produced by the operator oscillating the lever 38. An arm or cam 38' projecting from the lever supports a roller 41 and this roller is mounted on a spindle 41' carried by a vertical pillar 37' rigid with the platform 37 on which the vat is mounted. When the lever 38 is oscillated it will be understood that the vat is raised and lowered.

When the extremities 1a of blades 1 have been suitably dipped, it suffices to turn the frame 19 through 180° to introduce the extremities 1b of the blades into a position immediately above the vat.

It will be understood that the vat may be raised and lowered mechanically, for example, by means of a cam; and that the preceding description has been given by way of example, it being possible to carry out the invention in other ways within the scope of the following claims.

What I claim is:—

1. An apparatus of the type described, including a spring holder to receive and support articles for end coating, means for feeding the articles singly to the holder, and means cooperating with the feeding means for arranging the articles in spaced superimposed relation in the holder.

2. An apparatus of the type described, including a spring holder adapted to receive and support a plurality of articles, means for feeding the articles singly to the holder, and means synchronized with the feeding means for placing the articles within the holder in spaced superimposed parallel relation.

3. In an apparatus of the type described, an article receiver including a plurality of spring holders for the articles, a carriage supporting said spring holders, means for feeding the articles to and within a particular holder, and means synchronized with the feeding means for advancing the carriage and therefore the holders for successive cooperation with the feeding means.

4. In an apparatus of the type described, a frame, a spring holder carried by the frame, and a feeding means cooperating with the holder to deliver an article within the holder, said frame being mounted for rotative movement to arrange the holder in position to dispose the contained article on end for dipping purposes.

5. In an apparatus of the type described, a holding frame mounted for rotative movement, a plurality of spring holders arranged on opposite sides of the frame, means for feeding the articles to a particular holder, means synchronized with the feeding means for advancing the frame to arrange the holders in succession for feeding purposes, the rotation of the frame permitting the holders on the respective sides thereof to be disposed in feeding relation in succession.

6. In an apparatus of the type described, a holding frame mounted for rotative movement, a plurality of spring holders arranged on opposite sides of the frame, means for feeding the articles to a particular holder, and means synchronized with the feeding means for advancing the frame to arrange the holders in succession for feeding purposes, the rotation of the frame permitting the holders on the respective sides thereof to be disposed in feeding relation in succession, the rotative movement of the frame permitting the frame and charged holders to be arranged in a position at right angles to their feeding position to present the ends of the contained articles for dipping.

7. In an apparatus of the type described, a holding frame, a plurality of spring holders on each of the respective sides of said frame, a feeding means for the articles, and means synchronized with the feeding means for advancing the frame to successively present the holders of the uppermost set to the feeding means, the frame being mounted for rotation to permit the respective sets of holders to be positioned for feeding reception.

8. In an apparatus of the type described, a frame mounted for rotation, a plurality of spring holders carried by the frame, means for feeding the articles singly to one of the holders, means synchronized with the feeding means for delivering a plurality of articles to each holder in superimposed relation, and means synchronized with the feeding means for advancing the frame to successively present the holders thereon in cooperative relation with the feeding means.

9. In an apparatus of the type described, an article holder made up of a series of cooperating spring supports, feeding means for delivering the articles singly to a spring support, and a delivery element synchronized with the feeding means to deliver a plurality of articles to each spring support in spaced parallel relation vertically of said support.

10. In an apparatus of the type described, an article holder made up of a series of cooperating spring supports, feeding means for delivering the articles singly to a spring support, a delivery element synchronized with the feeding means to deliver a plurality of articles to each spring support in spaced parallel relation vertically of said support, and means synchronized with the feeding means for advancing the frame to arrange the spring supports of a holder successively in cooperation with the feeding means.

WALTER ROY WEEKS.